(12) United States Patent
Byun

(10) Patent No.: US 11,561,712 B2
(45) Date of Patent: Jan. 24, 2023

(54) STORAGE DEVICE AND METHOD OF OPERATING THE SAME

(71) Applicant: SK hynix Inc., Gyeonggi-do (KR)

(72) Inventor: Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/238,848

(22) Filed: Apr. 23, 2021

(65) Prior Publication Data

US 2022/0121379 A1 Apr. 21, 2022

(30) Foreign Application Priority Data

Oct. 20, 2020 (KR) .......................... 10-2020-0136166

(51) Int. Cl.
*G06F 3/06* (2006.01)
*G06F 12/0802* (2016.01)

(52) U.S. Cl.
CPC .......... *G06F 3/0638* (2013.01); *G06F 3/0604* (2013.01); *G06F 3/0679* (2013.01); *G06F 12/0802* (2013.01); *G06F 2212/60* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883;

(Continued)

(56) References Cited

U.S. PATENT DOCUMENTS 5,155,825 A * 10/1992 Moughanni ......... G06F 12/1027
711/E12.072
6,000,006 A * 12/1999 Bruce ................. G06F 12/0802
714/E11.038

(Continued)

FOREIGN PATENT DOCUMENTS

KR 10-1739556 B1 5/2017
KR 10-1936364 B1 1/2019

OTHER PUBLICATIONS

Y. -J. Woo, S. Lee and S. L. Min, "FMMU: A Hardware-Accelerated Flash Map Management Unit for Scalable Performance of Flash-Based SSDs," 2018 55th ACM/ESDA/IEEE Design Automation Conference (DAC), 2018, pp. 1-6, doi: 10.1109/DAC.2018.8465808. (Year: 2018).*

(Continued)

*Primary Examiner* — Daniel C. Chappell
(74) *Attorney, Agent, or Firm* — IP & T Group LLP

(57) ABSTRACT

The present technology relates to an electronic device. According to the present technology, a storage device having an improved physical address obtainment speed may include a nonvolatile memory device configured to store map data including a plurality of map segments including mapping information and, a volatile memory device including a first map cache area temporarily storing the map data configured by map entries each corresponding to one logical address, and a second map cache area temporarily storing the map data configured by map indexes each corresponding to a plurality of logical addresses.

19 Claims, 14 Drawing Sheets

(58) Field of Classification Search
CPC .............. G06F 2009/45562–45595; G06F
2015/761–768; G06F 2201/00–885; G06F
2206/00–20; G06F 2209/00–549; G06F
2211/00–902; G06F 2212/00–7211; G06F
2213/00–4004; G06F 2216/00–17; G06F
2221/00–2153; G06K 9/00–6298; G06N
3/00–126; G06N 5/00–048; G06N
7/00–08; G06N 10/00; G06N 20/00–20;
G06N 99/00–007; G06T 1/00–60; G06V
30/00–43; G11B 20/00–24; G11B
33/00–1493; G11C 11/00–5692; G11C
13/00–06; G11C 14/00–009; G11C
15/00–06; G11C 16/00–3495; G11C
17/00–18; G11C 2207/00–229; G11C
2216/00–30; H01L 25/00–50; H01L
27/00–3293; H01L 2225/00–1094; H03M
7/00–707; H04L 9/00–38; H04L
12/00–66; H04L 41/00–5096; H04L
49/00–9094; H04L 61/00–59; H04L
67/00–75
See application file for complete search history.

(56) References Cited

U.S. PATENT DOCUMENTS

| | | | | |
|---|---|---|---|---|
| 7,058,753 | B2* | 6/2006 | Mori | G06F 3/0634 |
| | | | | 711/100 |
| 7,877,569 | B2* | 1/2011 | Honda | G06F 3/0679 |
| | | | | 711/202 |
| 7,984,233 | B2* | 7/2011 | Sinclair | G06F 3/0643 |
| | | | | 711/202 |
| 8,219,776 | B2* | 7/2012 | Forhan | G06F 12/0246 |
| | | | | 711/170 |
| 9,134,918 | B2* | 9/2015 | Yurzola | G06F 12/0246 |
| 2003/0041222 | A1* | 2/2003 | Akey | G06F 12/1009 |
| | | | | 711/E12.059 |
| 2010/0332730 | A1* | 12/2010 | Royer, Jr. | G06F 12/0246 |
| | | | | 711/E12.008 |
| 2011/0231593 | A1* | 9/2011 | Yasufuku | G06F 12/12 |
| | | | | 711/3 |
| 2013/0111116 | A1* | 5/2013 | Inada | G06F 12/127 |
| | | | | 711/E12.008 |
| 2014/0082252 | A1* | 3/2014 | Alexander | G06F 12/1054 |
| | | | | 711/E12.024 |
| 2019/0361627 | A1* | 11/2019 | Lai | G06F 12/1009 |
| 2020/0326874 | A1* | 10/2020 | Lai | G06F 3/0604 |

OTHER PUBLICATIONS

Y. J. Seong et al., "Hydra: A Block-Mapped Parallel Flash Memory Solid-State Disk Architecture," in IEEE Transactions on Computers, vol. 59, No. 7, pp. 905-921, Jul. 2010, doi: 10.1109/TC.2010.63. (Year: 2010).*

Y. Pan, Y. Li, H. Zhang, H. Chen and M. Lin, "GFTL: Group-Level Mapping in Flash Translation Layer to Provide Efficient Address Translation for NAND Flash-Based SSDs," in IEEE Transactions on Consumer Electronics, vol. 66, No. 3, pp. 242-250, Aug. 2020, doi: 10.1109/TCE.2020.2991213. (Year: 2020).*

H. Kim and D. Shin, "Clustered page-level mapping for flash memory-based storage devices," in IEEE Transactions on Consumer Electronics, vol. 61, No. 1, pp. 47-55, Feb. 2015, doi: 10.1109/TCE.2015.7064110. (Year: 2015).*

* cited by examiner

STORAGE DEVICE AND METHOD OF OPERATING THE SAME

CROSS-REFERENCE TO RELATED APPLICATION

The present application claims priority under 35 U.S.C. § 119(a) to Korean patent application number 10-2020-0136166, filed on Oct. 20, 2020, which is incorporated herein by reference in its entirety.

BACKGROUND

Field of Invention

The present disclosure relates to an electronic device, and more particularly, to a storage device and a method of operating the same.

Description of Related Art

A storage device is a device that stores data under control of a host device such as a computer or a smartphone. A storage device may include a memory device storing data and a memory controller controlling the memory device. The memory device may be classified into a volatile memory device and a nonvolatile memory device.

The volatile memory device may be a device that stores data only when power is supplied and loses the stored data when the power supply is cut off. The volatile memory device may include a static random access memory (SRAM), a dynamic random access memory (DRAM), and the like.

The nonvolatile memory device is a device that does not lose data even though power is cut off. The nonvolatile memory device includes a read only memory (ROM), a programmable ROM (PROM), an electrically programmable ROM (EPROM), an electrically erasable and programmable ROM (EEPROM), a flash memory, and the like.

SUMMARY

An embodiment of the present disclosure provides a storage device having an improved physical address obtainment speed and a method of operating the same.

According to an embodiment of the present disclosure, a storage device may include a nonvolatile memory device configured to store map data including a plurality of map segments including mapping information between a logical address provided by a host and a physical address, a volatile memory device including a first map cache area temporarily storing the map data configured by map entries each corresponding to one logical address, and a second map cache area temporarily storing the map data configured by map indexes each corresponding to a plurality of logical addresses and a memory controller configured to: obtain a physical address corresponding to a logical address of an operation request from the first map cache area in response to the operation request input from the host, obtain the physical address corresponding to the logical address of the operation request from the second map cache area when the physical address corresponding to the logical address of the operation request does not exist in the first map cache area, and control the nonvolatile memory device to perform an operation on the obtained physical address in response to the operation request.

According to an embodiment of the present disclosure, a storage device may include a nonvolatile memory device including a map data block and normal blocks, a volatile memory device including a first map cache area temporarily storing map data included in some of a plurality of map segments stored in the map data block in a first mapping unit, and a second map cache area temporarily storing map data included in a map segment, which is removed from the first map cache area, in a second mapping unit and a memory controller configured to obtain a physical address related to a logical address included in an operation request from one of the first map cache area and the second map cache area, and control the nonvolatile memory device to perform an operation corresponding to the operation request based on the obtained physical address related to the logical address included in the operation request, wherein a size of data corresponding to the first mapping unit is less than a size of data corresponding to the second mapping unit.

According to an embodiment of the present disclosure, a storage system may include a storage medium configured to store therein plural map segments each configured by plural map entries each related to a physical address, a first cache configured to cache, therein from the storage medium, one or more first map segments, a second cache configured to cache, therein from the first cache, one or more second map segments each configured by plural map groups each related to plural physical addresses and a controller configured to control the storage medium to perform an operation by searching, in order of the first cache, the second cache and the storage medium, for any of the map entry and the map group including a requested logical address, and evict one or more among the first map segments from the first cache to cache the evicted first map segments into the second cache by converting the evicted first map segments to the second map segments.

According to the present technology, a storage device having an improved physical address obtainment speed and a method of operating the same are provided.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and the descriptions are not limited to the embodiments described in the present specification or application.

Figure 1:
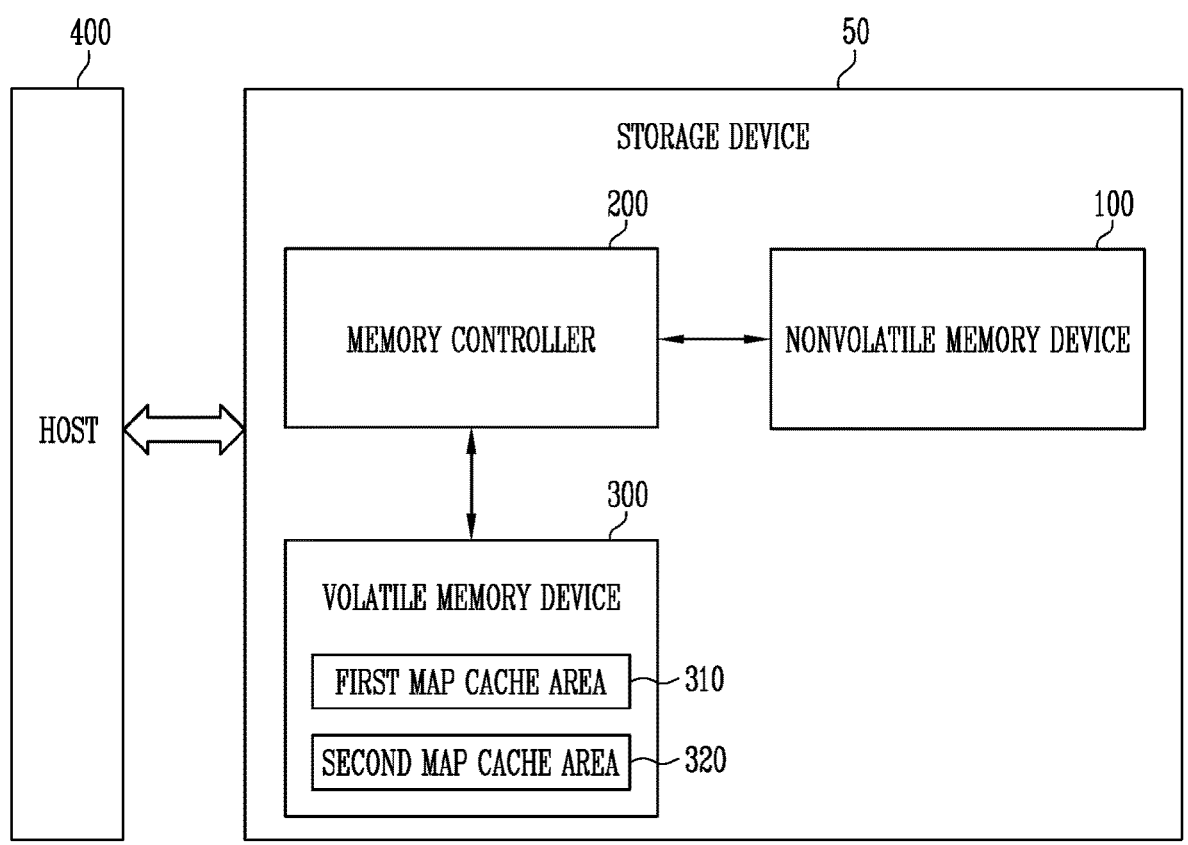
FIG. 1 is a diagram illustrating a storage device according to an embodiment of the present disclosure.

FIG. 1 is a diagram illustrating a storage device according to an embodiment of the present disclosure.

Referring to FIG. 1, the storage device 50 may include a nonvolatile memory device 100 and a memory controller 200. The storage device 50 may be a device that stores data under control of a host 400 such as a cellular phone, a smartphone, an MP3 player, a laptop computer, a desktop computer, a game player, a TV, a tablet PC, or an in-vehicle infotainment system. Alternatively, the storage device 50 may be a device that stores data under the control of the host 400 that stores high-capacity data in one place, such as a server or a data center.

The storage device 50 may be manufactured as one of various types of storage devices according to a host interface that is a communication method with the host 400. For example, the storage device 50 may be configured as any of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 50 may be manufactured as any of various types of packages. For example, the storage device 50 may be manufactured as any of various types of package types, such as a package on package (POP), a system in package (SIP), a system on chip (SOC), a multi-chip package (MCP), a chip on board (COB), a wafer-level fabricated package (WFP), and a wafer-level stack package (WSP).

The nonvolatile memory device 100 may store data. The nonvolatile memory device 100 operates under control of the memory controller 200. The nonvolatile memory device 100 may include a memory cell array (not shown) including a plurality of memory cells that store data.

Each of the memory cells may be configured as a single level cell (SLC) that stores one data bit, a multi-level cell (MLC) that stores two data bits, a triple level cell (TLC) that stores three data bits, or a quad level cell (QLC) capable of storing four data bits The memory cell array (not shown) may include a plurality of memory blocks. Each memory block may include a plurality of memory cells. Each memory block may include a plurality of pages. In an embodiment, the page may be a unit for storing data in the nonvolatile memory device 100 or reading data stored in the nonvolatile memory device 100. The memory block may be a unit for erasing data.

In an embodiment, the nonvolatile memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like. In the present specification, for convenience of description, the nonvolatile memory device 100 is a NAND flash memory.

The nonvolatile memory device 100 is configured to receive a command and an address from the memory controller 200 and access an area selected by the address in the memory cell array. The nonvolatile memory device 100 may perform an operation instructed by the command on the area selected by the address. For example, the nonvolatile memory device 100 may perform a write operation (program operation), a read operation, and an erase operation. During the program operation, the nonvolatile memory device 100 may program data in the area selected by the address. During the read operation, the nonvolatile memory device 100 may read data from the area selected by the address. During the erase operation, the nonvolatile memory device 100 may erase data stored in the area selected by the address.

The memory controller 200 may control an overall operation of the storage device 50.

When power is applied to the storage device 50, the memory controller 200 may execute firmware (FW). When the nonvolatile memory device 100 is a flash memory device, the memory controller 200 may execute firmware such as a flash translation layer (FTL) for controlling communication between the host 400 and the nonvolatile memory device 100.

In an embodiment, the memory controller 200 may receive data and a logical address (LA) from the host 400 and may convert the LA into a physical address (PA) indicating an address of memory cells, included in the nonvolatile memory device 100, in which data is to be stored.

The memory controller 200 may control the nonvolatile memory device 100 to perform the program operation, the read operation, or the erase operation according to a request of the host 400. During the program operation, the memory controller 200 may provide a program command, the PA, and data to the nonvolatile memory device 100. During the read operation, the memory controller 200 may provide a read command and the PA to the nonvolatile memory device 100. During the erase operation, the memory controller 200 may provide an erase command and the PA to the nonvolatile memory device 100.

In an embodiment, the memory controller 200 may generate a command, an address, and data independently regardless of the request from the host 400 and transmit the command, the address, and the data to the nonvolatile memory device 100. For example, the memory controller 200 may provide the command, the address, and the data for performing a program operation, a read operation and a erase operation accompanying the performing of wear leveling, read reclaim, garbage collection, and the like, to the nonvolatile memory device 100.

In an embodiment, the memory controller 200 may control at least two or more nonvolatile memory devices 100. In this case, the memory controller 200 may control the nonvolatile memory devices 100 according to an interleaving method to improve operation performance. The interleaving method may be a method of controlling operations for at least two nonvolatile memory devices 100 to overlap with each other.

The nonvolatile memory device 100 may store map data including mapping information between a logical address provided by the host 400 and a physical address corresponding to the logical address. The map data may include a plurality of map segments. One map segment may include a plurality of map entries. One map entry may include mapping information on one logical address. One logical address within a map entry may be an address corresponding to 4 KB of data stored in the normal block within the nonvolatile memory device 100. This is referred to as 4 KB mapping.

The memory controller 200 may obtain the physical address corresponding to the input logical address or a requested logical address according to a request of the host 400, store data in the obtained physical address, or read the stored data. The memory controller 200 may obtain a physical address corresponding to the requested logical address so that the memory controller 200 can perform the operation on the storage area indicated by the obtained physical address within the nonvolatile memory device 100. Since the map data is stored in the nonvolatile memory device 100, the memory controller 200 reads the map segment including the map entry of the requested logical address from the nonvolatile memory device 100, and obtains the physical address from the read map segment, before performing the operation on the storage area indicated by the obtained physical address.

The volatile memory device 300 may temporarily store data to be stored in the nonvolatile memory device 100 or data read from the nonvolatile memory device 100. Since the volatile memory device 300 has an operation speed relatively higher than that of the nonvolatile memory device 100, when the map data is previously stored in the volatile memory device 300, the memory controller 200 may obtain the physical address corresponding to the requested logical address more quickly. Therefore, the storage device 50 may use a portion of the volatile memory device 300 as one type of cache memory for the map data.

Figure 5:
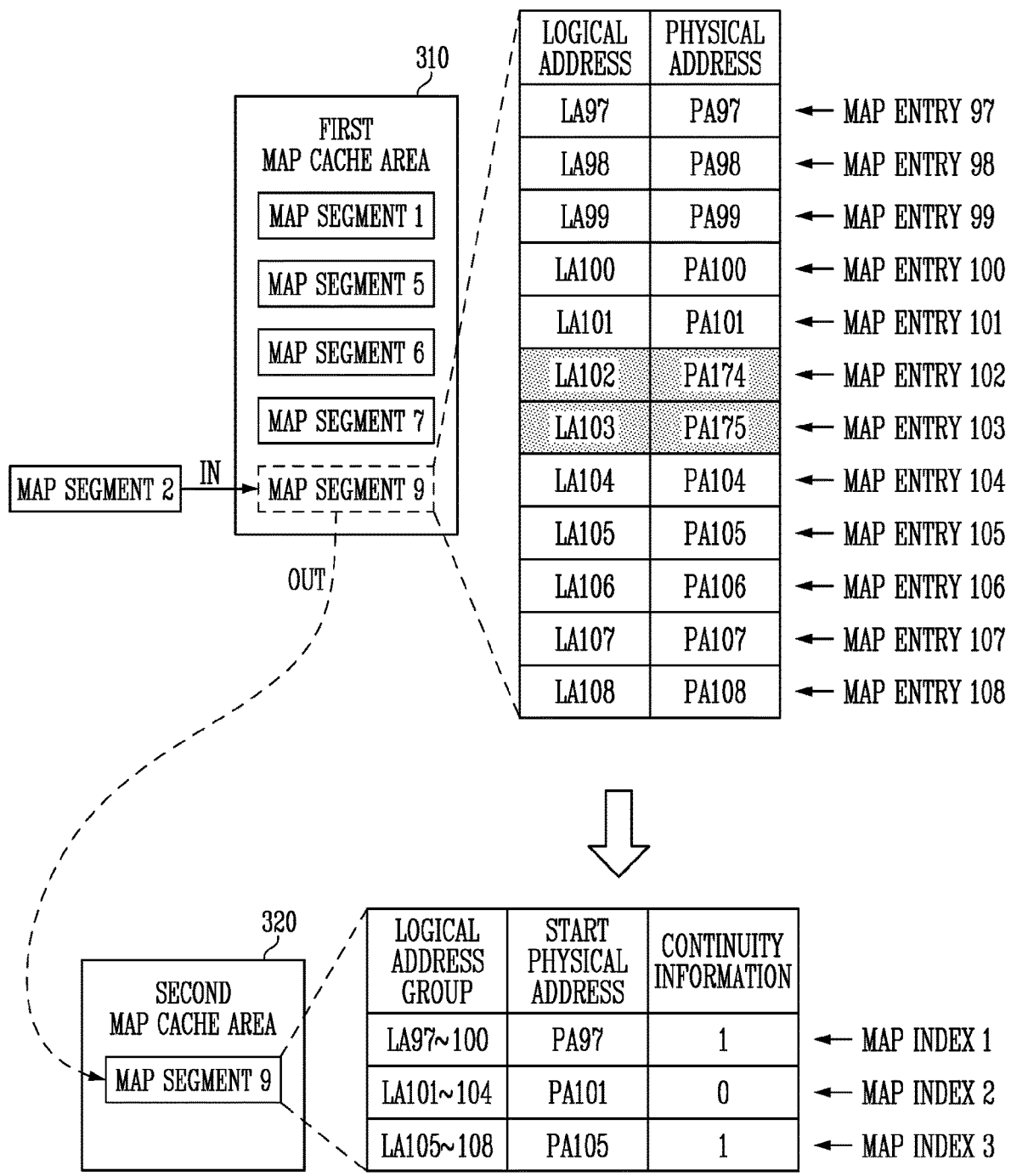
FIG. 5 is a diagram illustrating an operation of storing map data in a second map cache area.

According to an embodiment of the present disclosure, the volatile memory device 300 may include a plurality of map cache areas. Specifically, the volatile memory device 300 may include a first map cache area 310 and a second map cache area 320. Here, the first map cache area 310 may include mapping information in units of map entries such as the map data stored in the nonvolatile memory device 100. The second map cache area 320 may include mapping information in units of the map indexes each corresponding to a plurality of map entries. Specifically, the second map cache area 320 may include mapping information configured by the map indexes. One map index may correspond to a plurality of map entries. That is, one map index may correspond to a map entry group. For example, the map data included in the first map cache area 310 may include mapping information according to a 4 KB mapping method. The map data included in the second map cache area 320 may include mapping information according to a 16 KB mapping method. According to the 16 KB mapping method, logical addresses within a map index may be addresses corresponding to 16 KB of data stored in the normal block within the nonvolatile memory device 100. That is, a size of data corresponding to the map entry included in the first map cache area 310 and a size of data corresponding to the map index included in the second map cache area 320 may be different. The size of the data corresponding to the map index included in the second map cache area 320 may be an integer multiple of the size of the data corresponding to the map entry included in the first map cache area 310. Here, a ratio of the size of the data corresponding to the map index included in the second map cache area 320 and the size of the data corresponding to the map entry included in the first map cache area 310 may correspond to a number of map entries corresponding to the map index. Therefore, in an embodiment, each of the first map cache area 310 and the second map cache area 320 may cache the map data in units of the map segments, as illustrated in FIG. 5. The map segment cached in the first map cache area 310 may be configured by a plurality of map entries each having map information of the 4 KB mapping method. The map segment cached in the second map cache area 320 may be configured by a plurality of map indexes each having map information of the 16 KB mapping method.

The host 400 may communicate with the storage device 50 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

Figure 2:
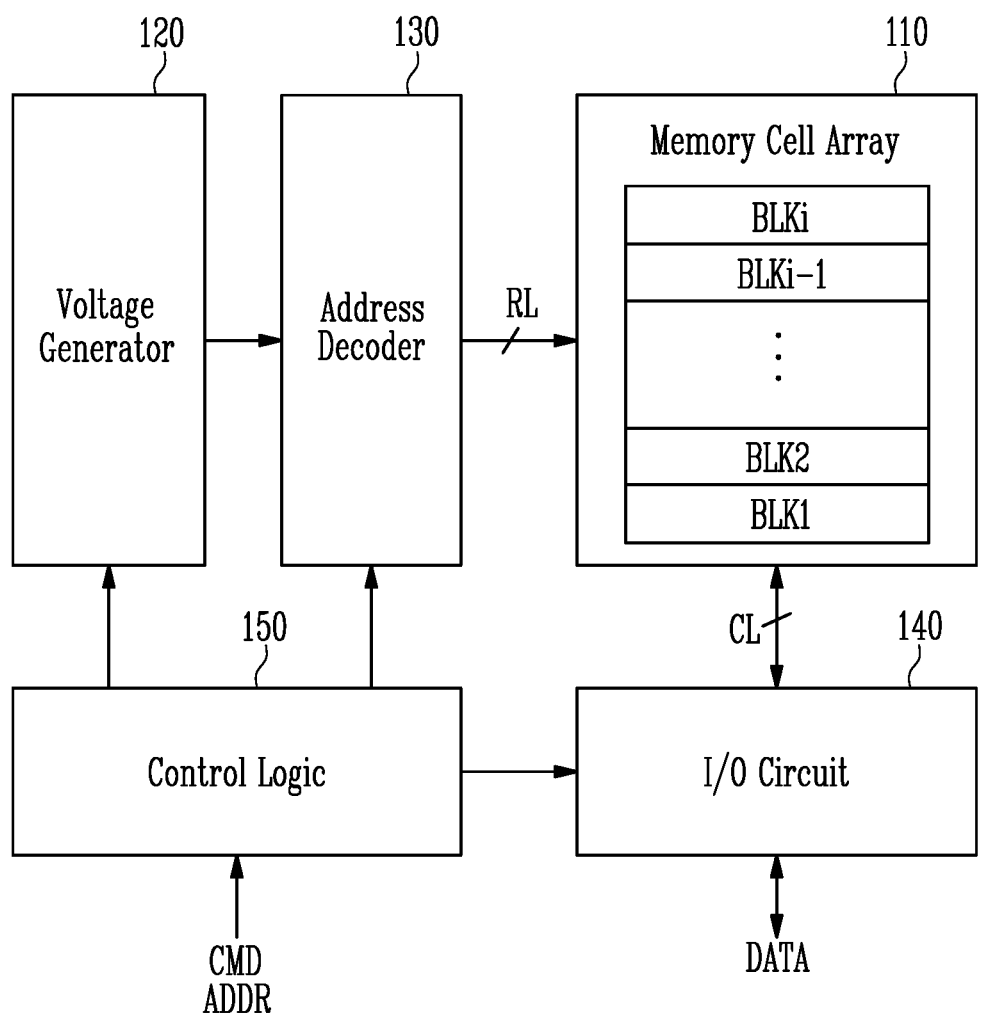
FIG. 2 is a diagram illustrating a nonvolatile memory device of FIG. 1.

FIG. 2 is a diagram illustrating the nonvolatile memory device of FIG. 1.

Referring to FIG. 2, the nonvolatile memory device 100 may include a memory cell array 110, a voltage generator 120, an address decoder 130, an input/output circuit 140, and a control logic 150.

The memory cell array 110 includes a plurality of memory blocks BLK1 to BLKi. The plurality of memory blocks BLK1 to BLKi are connected to the address decoder 130 through row lines RL. The plurality of memory blocks BLK1 to BLKi may be connected to the input/output circuit 140 through column lines CL. In an embodiment, the row lines RL may include word lines, source select lines, and drain select lines. In an embodiment, the column lines CL may include bit lines.

Each of the plurality of memory blocks BLK1 to BLKi includes a plurality of memory cells. In an embodiment, the plurality of memory cells may be nonvolatile memory cells. Memory cells connected to the same word line among the plurality of memory cells may be defined as one physical page. That is, the memory cell array 110 may include a plurality of physical pages. Each of the memory cells of the nonvolatile memory device 100 may be configured as an SLC that stores one data bit, an MLC that stores two data bits, a TLC that stores three data bits, or a QLC capable of storing four data bits.

Some of the plurality of memory blocks BLK1 to BLKi may be map data blocks that store the map data described with reference to FIG. 1. The remaining of the plurality of memory blocks BLK1 to BLKi may be normal blocks that store data requested by the host 400.

In an embodiment, the voltage generator 120, the address decoder 130, and the input/output circuit 140 may be collectively referred to as a peripheral circuit. The peripheral circuit may drive the memory cell array 110 under control of the control logic 150. The peripheral circuit may drive the memory cell array 110 to perform the program operation, the read operation, and the erase operation.

The voltage generator 120 is configured to generate a plurality of operation voltages using an external power voltage supplied to the nonvolatile memory device 100. The voltage generator 120 operates in response to the control of the control logic 150.

In an embodiment, the voltage generator 120 may generate an internal power voltage by regulating the external power voltage. The internal power voltage generated by the voltage generator 120 is used as an operation voltage of the nonvolatile memory device 100.

In an embodiment, the voltage generator 120 may generate the plurality of operation voltages using an external power voltage or an internal power voltage. The voltage generator 120 may be configured to generate various voltages required in the nonvolatile memory device 100. For example, the voltage generator 120 may generate a plurality of erase voltages, a plurality of program voltages, a plurality of pass voltages, a plurality of selected read voltages, and a plurality of unselected read voltages.

The voltage generator 120 may include a plurality of pumping capacitors that receive the internal power voltage to generate the plurality of operation voltages having various voltage levels, and may generate the plurality of operation voltages by selectively activating the plurality of pumping capacitors in response to the control of the control logic 150.

The generated plurality of operation voltages may be supplied to the memory cell array 110 by the address decoder 130.

The address decoder 130 is connected to the memory cell array 110 through the row lines RL. The address decoder 130 is configured to operate in response to the control of the control logic 150. The address decoder 130 may receive an address ADDR from the control logic 150. The address decoder 130 may decode a block address among the received addresses ADDR. The address decoder 130 selects at least one memory block among the memory blocks BLK1 to BLKi according to the decoded block address. The address decoder 130 may decode a row address among the received addresses ADDR. The address decoder 130 may select at least one word line among word lines of a selected memory block according to the decoded row address. In an embodiment, the address decoder 130 may decode a column address among the received addresses ADDR. The address decoder 130 may connect the input/output circuit 140 and the memory cell array 110 to each other according to the decoded column address.

For example, the address decoder 130 may include components such as a row decoder, a column decoder, and an address buffer.

The input/output circuit 140 may include a plurality of page buffers. The plurality of page buffers may be connected to the memory cell array 110 through the bit lines. During the program operation, data may be stored in selected memory cells according to data stored in the plurality of page buffers.

During the read operation, the data stored in the selected memory cells may be sensed through the bit lines, and the sensed data may be stored in the page buffers.

The control logic 150 may control the address decoder 130, the voltage generator 120, and the input/output circuit 140. The control logic 150 may operate in response to the command CMD transmitted from an external device. The control logic 150 may generate control signals in response to the command CMD and the address ADDR to control the peripheral circuits.

Figure 3:
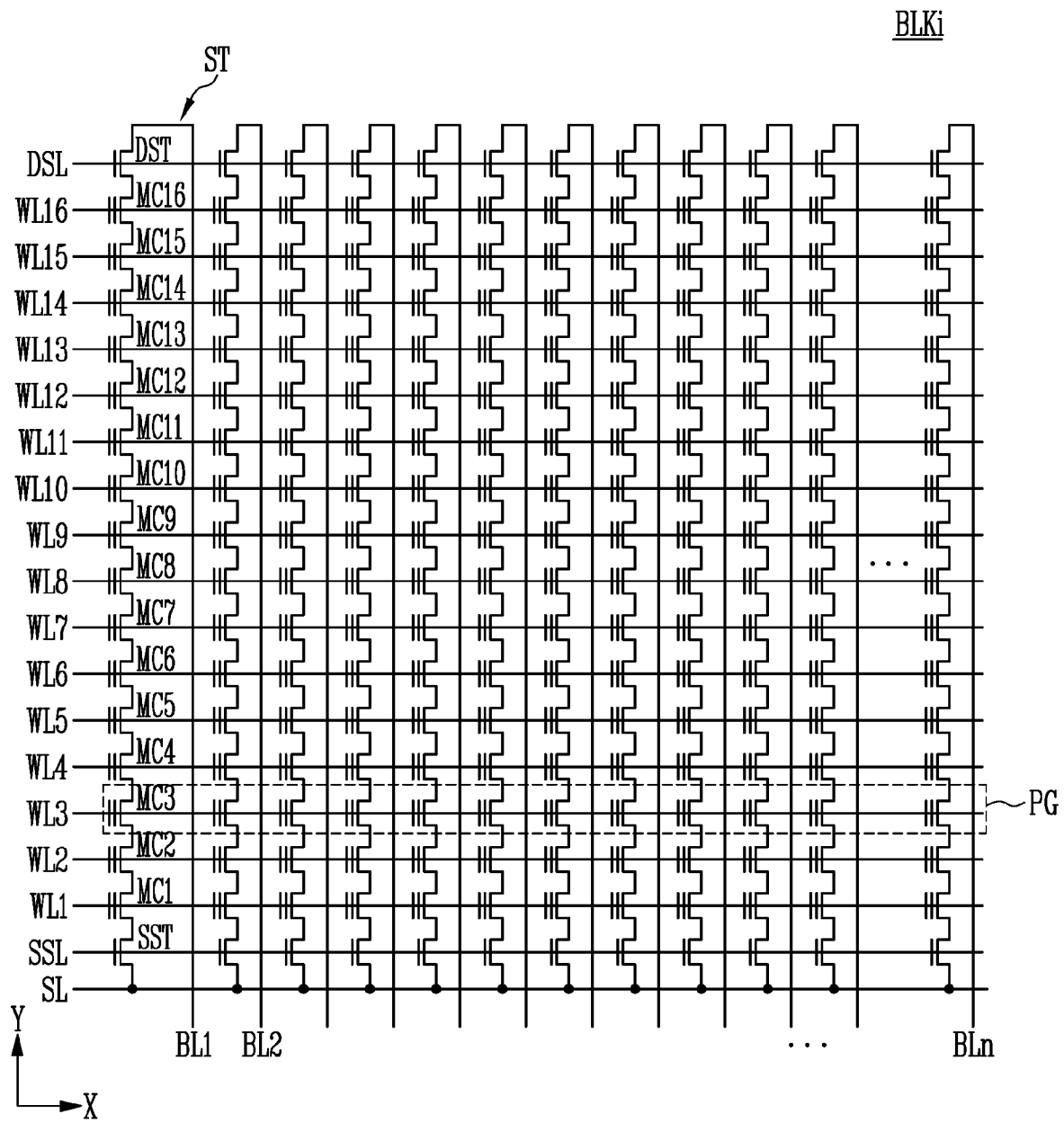
FIG. 3 is a diagram illustrating a structure of any one of memory blocks of FIG. 2.

FIG. 3 is a diagram illustrating a configuration of one of the memory blocks of FIG. 2.

The memory block BLKi is one memory block BLKi among the memory blocks BLK1 to BLKi of FIG. 2.

Referring to FIG. 3, a plurality of word lines arranged in parallel with each other may be connected between a first select line and a second select line. Here, the first select line may be the source select line SSL, and the second select line may be the drain select line DSL. More specifically, the memory block BLKi may include a plurality of strings ST connected between the bit lines BL1 to BLn and a source line SL. The bit lines BL1 to BLn may be connected to the strings ST, respectively, and the source line SL may be commonly connected to the strings ST. Since the strings ST may be configured to be identical to each other, a string ST connected to the first bit line BL1 is specifically described, as an example.

The string ST may include a source select transistor SST, a plurality of memory cells MC1 to MC16, and a drain select transistor DST connected in series between the source line SL and the first bit line BL1. One string ST may include at least one or more source select transistor SST and the drain select transistor DST, and may include more memory cells than the number of memory cells MC1 to MC16 shown in the figure.

A source of the source select transistor SST may be connected to the source line SL and a drain of the drain select transistor DST may be connected to the first bit line BL1. The memory cells MC1 to MC16 may be connected in series between the source select transistor SST and the drain select transistor DST. Gates of the source select transistors SST included in the different strings ST may be connected to the source select line SSL, gates of the drain select transistors DST may be connected to the drain select line DSL, and gates of the memory cells MC1 to MC16 may be connected to the plurality of word lines WL1 to WL16. A group of the memory cells connected to the same word line among the memory cells included in different strings ST may be referred to as a page PG. Therefore, the memory block BLKi may include a number of pages PG corresponding to the number of the word lines WL1 to WL16.

One memory cell may store one bit of data. This is commonly called a single level cell (SLC). In this case, one physical page PG may store one logical page (LPG) data. The one logical page (LPG) data may include the same number of data bits as cells included in one physical page PG.

The one memory cell may store two or more bits of data. In this case, one physical page PG may store two or more logical page (LPG) data.

Figure 4:
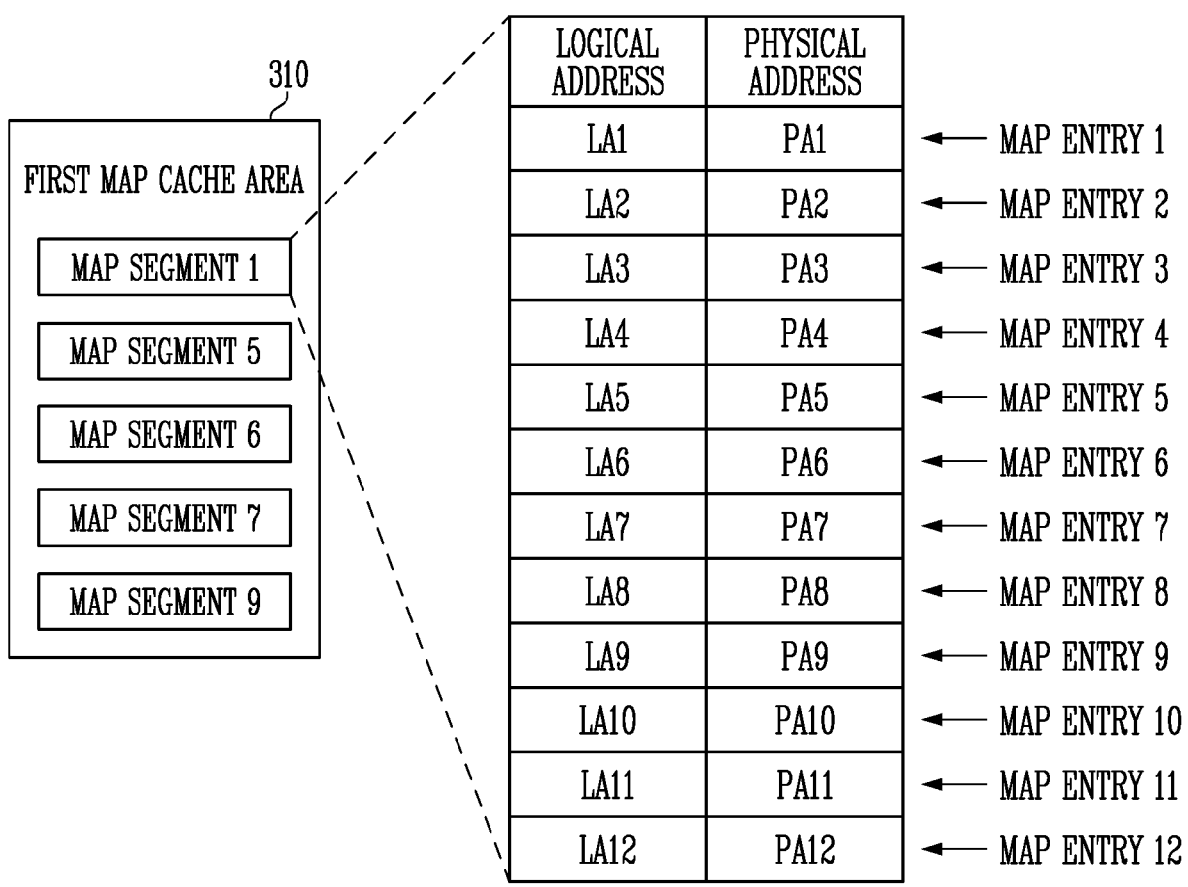
FIG. 4 is a diagram illustrating map data stored in a first map cache area included in a volatile memory device of FIG. 1.

FIG. 4 is a diagram illustrating the map data stored in the first map cache area included in the volatile memory device of FIG. 1.

Referring to FIG. 4, the first map cache area 310 may include a plurality of map segments. For convenience of description, in the present specification, five map segments may be stored in the first map cache area.

The first map cache area 310 may include a map segment 1, a map segment 5, a map segment 6, a map segment 7, and a map segment 9.

One map segment may include a plurality of map entries. In FIG. 4, one map segment includes 12 map entries. The map segment 1 may include mapping information on first to twelfth logical addresses LA1 to LA12.

The map segment 1 stored in the first map cache area 310 may include first to twelfth physical addresses PA1 to PA12 respectively corresponding to the first to twelfth logical addresses LA1 to LA12. Mapping information of one logical address and one physical address may be a map entry. Therefore, the map segment 1 may include a map entry 1 to a map entry 12.

FIG. 5 is a diagram illustrating an operation of storing map data in a second map cache area.

Referring to FIG. 5, the first map cache area 310 may include five map segments of a map segment 1, a map segment 5, a map segment 6, a map segment 7, and a map segment 9. In FIG. 5, a need to access mapping information on a logical address included in the map segment 2 occurs.

Since the first map cache area 310 may store only five map segments, at least one map segment is required to be removed from the first map cache area 310. A target segment that is a map segment to be removed among the map segments included in the first map cache area 310 may be the least recently used (LRU) map segment among the map segments included in the first map cache area 310. For the LRU scheme, the volatile memory device 300 described with reference to FIG. 1 may store information on when each of the map segments stored in the first map cache area 310 are used last.

In FIG. 5, when the map segment 9 is the LRU map segment, the map segment 9 may be removed from the first map cache area 310, and the map segment 2 may be stored at a position where the map segment 9 is removed from.

The target segment to be removed from the first map cache area 310 may be stored in the second map cache area 320. At this time, the map segment 9, which is the target segment to be removed from the first map cache area 310, may be converted to the map segment configured by the map indexes and then stored in the second map cache area 320, as illustrated in FIG. 5.

The map segment 9 cached in the first map cache area 310 may include a map entry 97 to a map entry 108. The map entry 97 may be mapping information on a 97th logical address LA97. The map entry 97 to the map entry 108 may be mapping information on the 97th logical address LA97 to a 108th logical address LA108, respectively.

The second map cache area 320 may store the map segment configured by the map indexes. Here, the map index may correspond to a plurality of map entries. In an embodiment, four map entries may correspond to one map index. Therefore, the 97th to 100th logical addresses LA97 to LA100 may correspond to a map index 1, the 101st to 104th logical addresses LA101 to LA104 may correspond to a map index 2, and the 105th to 108th logical addresses LA105 to LA108 may correspond to a map index 3. That is, one map index may include mapping information on a logical address group including a plurality of logical addresses. Here, the map index may include the logical address group and a start physical address that is a physical address corresponding to the smallest logical address among the plurality of logical addresses included in the logical address group. In an embodiment, the second map cache area 320 may further temporarily store continuity information of the map index. In FIG. 5, the continuity information "1" indicates that data corresponding to the map index are stored in continuous physical addresses, and the continuity information "0" indicates that the data corresponding to the map index are stored in discontinuous physical addresses. For example, as illustrated in FIG. 5, logical addresses LA102 and LA103 may correspond to physical addresses PA174 and PA175 within map entries MAP ENTRY 102 and MAP ENTRY 103, respectively. Those physical addresses PA174 and PA175 may not be continuous with remaining physical addresses within the map segment 9 MAP SEGMENT 9 cached in the first map cache area 310. Here, the continuous physical addresses may depend on whether the memory controller 200 may obtain data through one read operation. That is, the data stored in the continuous physical addresses may be obtained through one read operation, but the data stored in the discontinuous physical addresses may be obtained through a plurality of read operations. For example, as illustrated in FIG. 5, data corresponding to the map indexes MAP INDEX 1 to MAP INDEX 3 within the map segment 9 MAP SEGMENT 9 cached in the second map cache area 320 may be obtained through a plurality of read operations.

Figure 6:
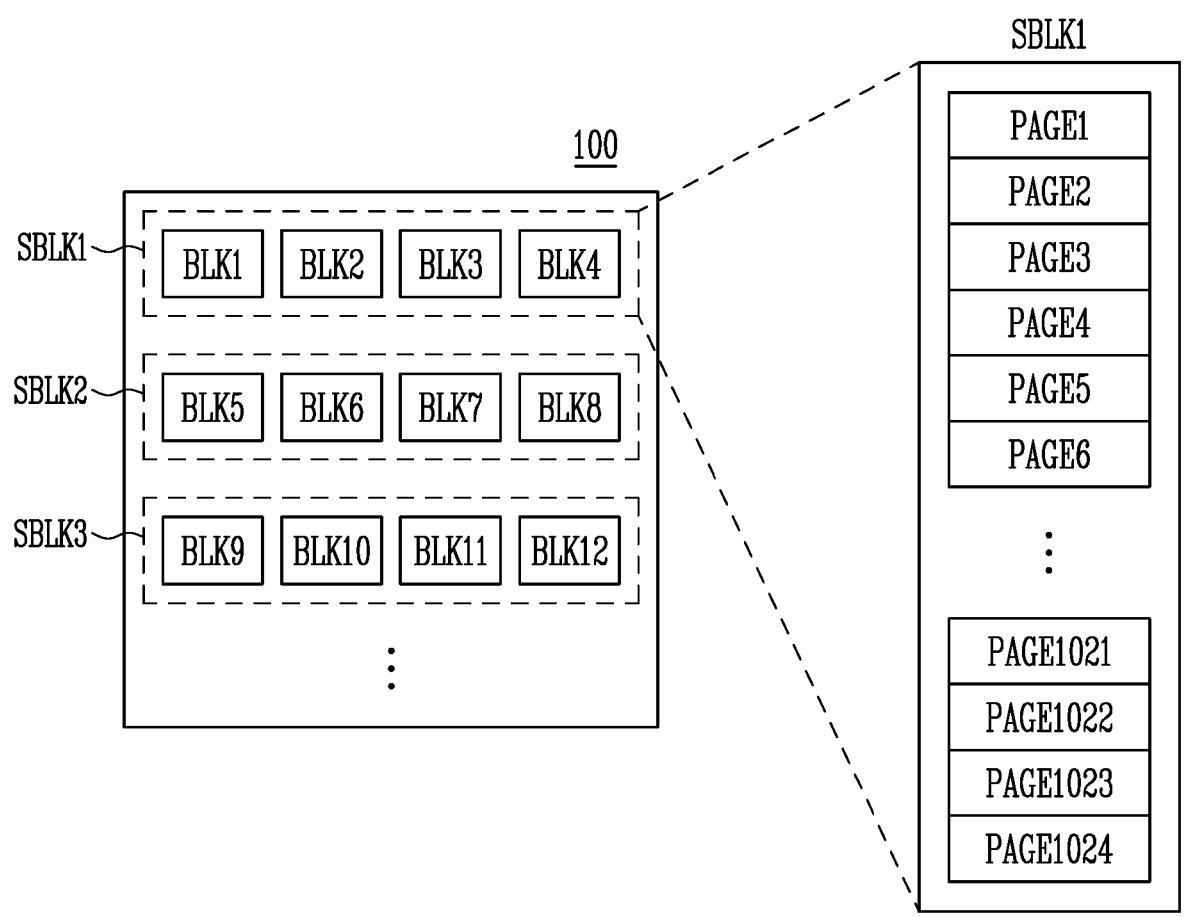
FIG. 6 is a diagram illustrating pages included in a super block.

FIG. 6 is a diagram illustrating pages included in a super block.

Referring to FIG. 6, the nonvolatile memory device 100 may include a plurality of super blocks SBLK1, SBLK2 and SBLK3, etc. In FIG. 6, one super block includes four memory blocks.

The super block may be a block defined to manage a plurality of memory blocks as one logical block. Therefore, pages included in one super block may be pages included in a plurality of memory blocks physically. In FIG. 6, the first super block SBLK1 may include 1024 pages. One page may be a unit of the read operation.

Figure 7:
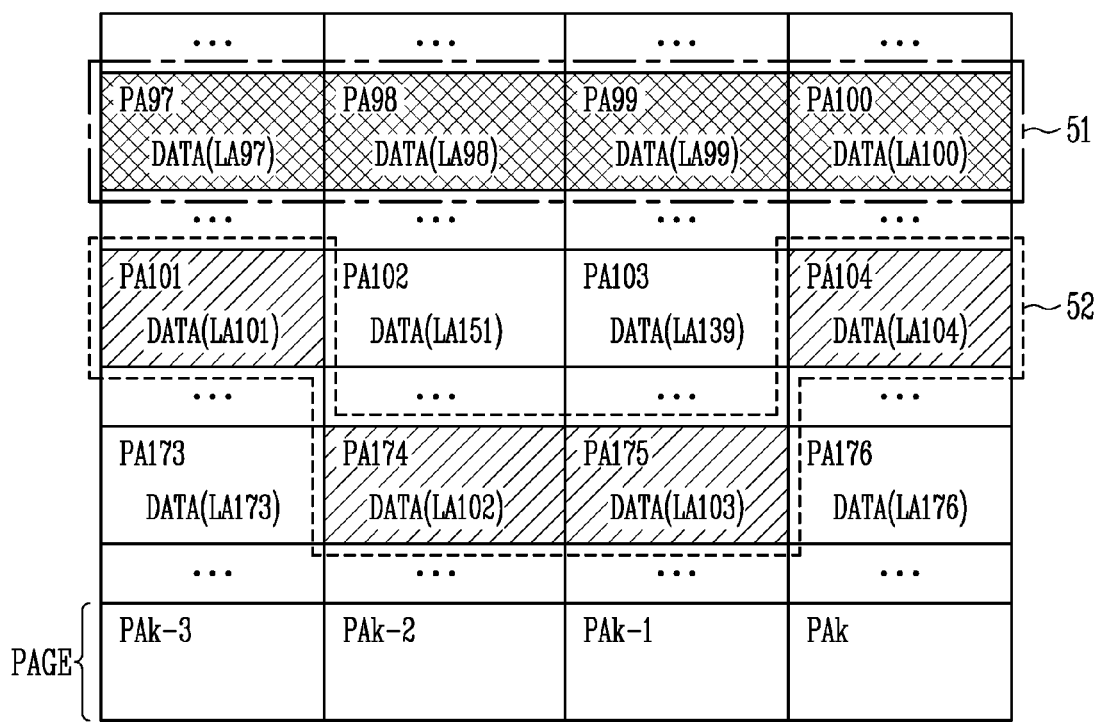
FIG. 7 is a diagram illustrating a continuous map index and a discontinuous map index.

FIG. 7 is a diagram illustrating a continuous map index and a discontinuous map index.

In FIG. 7, pages included in one memory block or super block and physical addresses are shown.

One page may be a unit of the read operation. One page may correspond to four physical addresses. That is, 97th to 100th physical addresses PA97 to PA100 may configure one page, 101st to 104th physical addresses PA101 to PA104 may configure one page, 173th to 176th physical addresses PA173 to PA176 may configure one page, and (k−3)-th to k-th physical addresses Pak-3 to PAk may configure one page.

Data DATA(LA97) corresponding to a 97th logical address may be stored in the 97th physical address PA97, data DATA(LA98) corresponding to a 98th logical address may be stored in the 98th physical address PA98, data DATA(LA99) corresponding to a 99th logical address may be stored in the 99th physical address PA99, and data DATA(LA100) corresponding to a 100th logical address may be stored in the 100th physical address PA100. In this case, the 97th to 100th physical addresses PA97 to PA100, which are physical addresses respectively corresponding to the four logical addresses LA97 to LA100, are continuously stored. Therefore, even though a start physical address in which the data corresponding to the 97th logical address LA97 is stored as a physical address corresponding to a first map index 51 only stores the 97th physical address PA97, mapping information of the 98-th to 100th logical addresses LA98 to LA100 may be easily known. Therefore, in this case, even though the mapping information is stored as configured by the map indexes, the physical addresses respectively corresponding to the logical addresses included in the map index may be obtained.

Conversely, data corresponding to the 101st to 104th logical addresses LA101 to 104 included in a second map index 52 are respectively distributed and stored in the 101st physical address PA101, the 174th physical address PA174, the 175th physical address PA175, and the 104th physical address PA104. Those physical addresses PA174 and PA175 may not be continuous with respect to the physical address PA101 as a start physical address. Therefore, the second map index 52 may correspond to those discontinuous physical addresses (i.e., the physical addresses that may not be continuously stored). Therefore, even though the second map index 52 has, as the start physical address, the 101st physical address PA101 mapped to the 101st logical address LA101, the data of the 102nd logical address LA102 and the 103rd logical address LA103 mapped to the discontinuous physical addresses PA174 and PA175 may not be obtained together with data of the logical addresses LA101 and LA104 mapped to the remaining physical addresses PA101 and PA104 through a single read operation.

Figure 8:
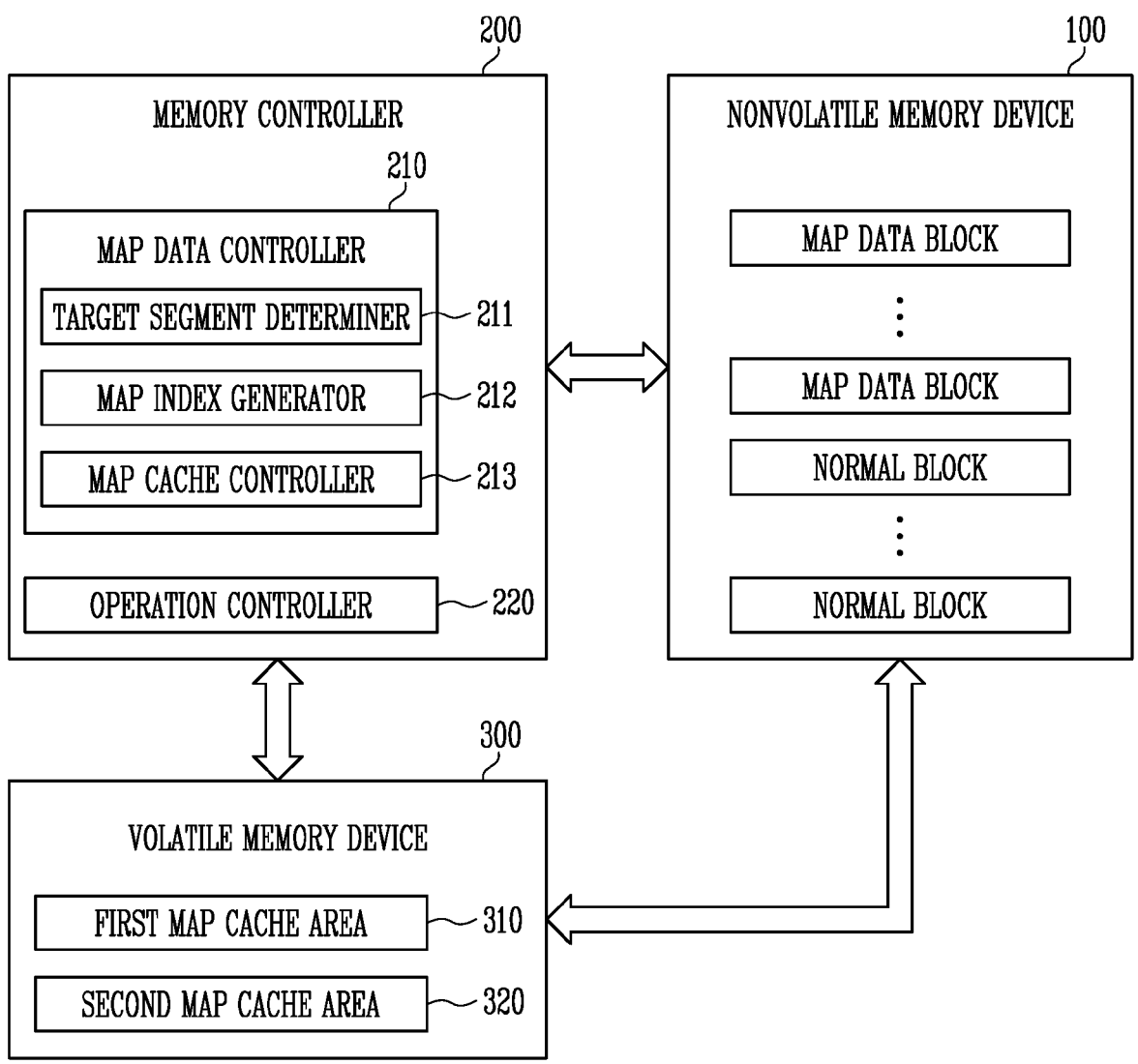
FIG. 8 is a diagram illustrating an operation of the storage device according to an embodiment of the present disclosure.

FIG. 8 is a diagram illustrating an operation of the storage device according to an embodiment of the present disclosure.

Referring to FIG. 8, the nonvolatile memory device 100 may include map data blocks and normal blocks. The map data blocks may store the map data. The map data may include a plurality of map segments. One map segment may include a plurality of map entries. One map entry may include mapping information on one logical address. One logical address within a map entry may be an address corresponding to 4 KB of data stored in the normal block within the nonvolatile memory device 100. This is referred to as 4 KB mapping.

The volatile memory device 300 may include a first map cache area 310 and a second map cache area 320. Here, the first map cache area 310 may include mapping information in units of the map entries such as the map data stored in the nonvolatile memory device 100. The second map cache area 320 may include mapping information in units of map indexes each corresponding to a plurality of map entries. Specifically, the second map cache area 320 may include mapping information configured by the map indexes. One map index may correspond to a plurality of map entries. That is, one map index may correspond to a map entry group. For example, the map data included in the first map cache area 310 may include mapping information according to a 4 KB mapping method. The map data included in the second map cache area 320 may include mapping information according to a 16 KB mapping method. According to the 16 KB mapping method, logical addresses within a map index may be addresses corresponding to 16 KB of data stored in the normal block within the nonvolatile memory device 100. That is, a size of data corresponding to the map entry included in the first map cache area 310 and a size of data corresponding to the map index included in the second map cache area 320 may be different. The size of the data corresponding to the map index included in the second map cache area 320 may be an integer multiple of the size of the data corresponding to the map entry included in the first map cache area 310. Here, a ratio of the size of the data corresponding to the map index included in the second map cache area 320 and the size of the data corresponding to the map entry included in the first map cache area 310 may correspond to the number of map entries corresponding to the map index. Therefore, in an embodiment, each of the first map cache area 310 and the second map cache area 320 may cache the map data in units of the map segments, as illustrated in FIG. 5. The map segment cached in the first map cache area 310 may be configured by a plurality of map entries each having map information of the 4 KB mapping method. The map segment cached in the second map cache area 320 may be configured by a plurality of map indexes each having map information of the 16 KB mapping method.

The map index may correspond to a plurality of map entries. In an embodiment, four map entries may correspond to one map index. That is, one map index may include mapping information on a logical address group including a plurality of logical addresses. Here, the map index may include the logical address group and a start physical address that is a physical address corresponding to the smallest logical address among the plurality of logical addresses included in the logical address group. In an embodiment, the second map cache area 320 may further temporarily store continuity information of the map index. The continuity information "1" indicates that data corresponding to the map index are stored in continuous physical addresses, and the continuity information "0" indicates that the data corresponding to the map index are stored in discontinuous physical addresses. Here, the continuous physical addresses may depend on whether the memory controller 200 may obtain data through one read operation. That is, the data stored in the continuous physical addresses may be obtained through one read operation, but the data stored in the discontinuous physical addresses may be obtained through a plurality of read operations.

The memory controller 200 may include a map data controller 210 and an operation controller 220.

The map data controller 210 may read the map data from a map data block included in the nonvolatile memory device 100 and store the read map data in the volatile memory device 300. Alternatively, the map data controller 210 may store the map data stored in the volatile memory device 300 in the map data block of the nonvolatile memory device 100.

The operation controller 220 may store data in the normal block or read data stored in the normal block in response to the request from the host 400. The operation controller 220 may obtain the physical address corresponding to the logical address input according to the request of the host 400 to perform a write operation or a read operation on the normal block. The operation controller 220 may first search for the logical address on which the operation is requested in the first map cache area 310, and when the map entry corresponding to the logical address on which the operation is requested is found in the first map cache area 310, the operation controller 220 may obtain the physical address from the found map entry. The operation controller 220 may perform an operation requested by the host 400 on the physical address.

When the map entry corresponding to the logical address on which the operation is requested is not included in the first map cache area 310, the operation controller 220 may search the second map cache area 320. When the map index corresponding to the logical address on which the operation is requested is found in the second map cache area 320, the operation controller 220 may check the continuity information of the found map index. When the found map index is checked to have the continuity information representing continuous physical addresses, the operation controller 220 may obtain the physical address mapped to the requested logical address from the found map index. Conversely, when the found map index is checked to have the continuity information representing discontinuous physical addresses, the operation controller 220 may control the map data controller 210 to obtain the physical address mapped to the requested logical address from the nonvolatile memory device 100.

Specifically, the map cache controller 213 may determine whether a residual space remains in the first map cache area 310. When the residual space remains in the first map cache area 310, the map cache controller 213 may read the map segment including the map entry corresponding to the logical address on which the operation is requested from the map data block of the nonvolatile memory device 100, and store the read map segment in the first map cache area 310. Thereafter, the operation controller 220 may obtain the physical address mapped to the requested logical address from the first map cache area 310.

Conversely, when a residual space does not remain in the first map cache area 310, a target segment determiner 211 may determine a target segment that is a map segment to be removed among the plurality of map segments stored in the first map cache area 310. The target segment may be the LRU map segment among the map segments included in the first map cache area 310. The volatile memory device 300 described with reference to FIG. 1 may store information on when each of the map segments stored in the first map cache area 310 are used last.

A map index generator 212 may generate the map index using the map entries included in the target segment. A map cache controller 213 may store the map segment configured by the generated map indexes in the second map cache area 320. When a residual space does not exist in the second map cache area 320, the LRU map segment may be removed from the second map cache area 320 according to the same method as the first map cache area 310.

In an embodiment of the present disclosure, the operation controller 220 may perform a migration operation of moving data using the map indexes stored in the second map cache area 320. The migration operation may be an operation of moving data stored in a source block to a target block.

The operation controller 220 may perform the migration operation when a residual space does not remain in the second map cache area 320. The operation controller 220 performs the migration operation of storing the data corresponding to the map entries included in the map index having the continuity information of "0" among the map indexes stored in the second map cache area 320 in the continuous physical address.

After performing the migration operation, the operation controller 220 may update the map index in which the mapping information is changed among the map indexes stored in the second map cache area 320.

In an embodiment, when performing the garbage collection operation, the read reclaim operation, or the wear leveling operation, the operation controller 220 may use the map indexes stored in the second map cache area 320 in selecting a memory block to which the data is to be moved.

For example, the operation controller 220 may determine the memory block, in which the data corresponding to the map entries included in the map index having the continuity information of "0" among the map indexes stored in the second map cache area 320 is stored, as a victim block of the garbage collection, and move valid data stored in the victim block to another memory block. Through this, the operation controller 220 may control the nonvolatile memory device 100 to perform the garbage collection for securing a free block and store the data in the continuous physical address.

In an embodiment, the operation controller 220 may determine the memory block, in which the data corresponding to the map entries included in the map index having the continuity information of "0" among the map indexes stored in the second map cache area 320 is stored, as a source block on which the read reclaim is to be performed. The operation controller 220 may move valid data stored in the source block to another memory block. Through this, the operation controller 220 may control the nonvolatile memory device 100 to transfer data of which a threshold voltage is to be changed due to read disturbance to another memory block and store the data in the continuous physical address.

In an embodiment, the operation controller 220 may determine the memory block, in which the data corresponding to the map entries included in the map index having the continuity information of "0" among the map indexes stored in the second map cache area 320 is stored, as a source block on which the wear leveling is to be performed. The operation controller 220 may move valid data stored in the source block to another memory block. Through this, the operation controller 220 may control the nonvolatile memory device 100 to manage life of the memory block and store the data in the continuous physical address.

Figure 9:
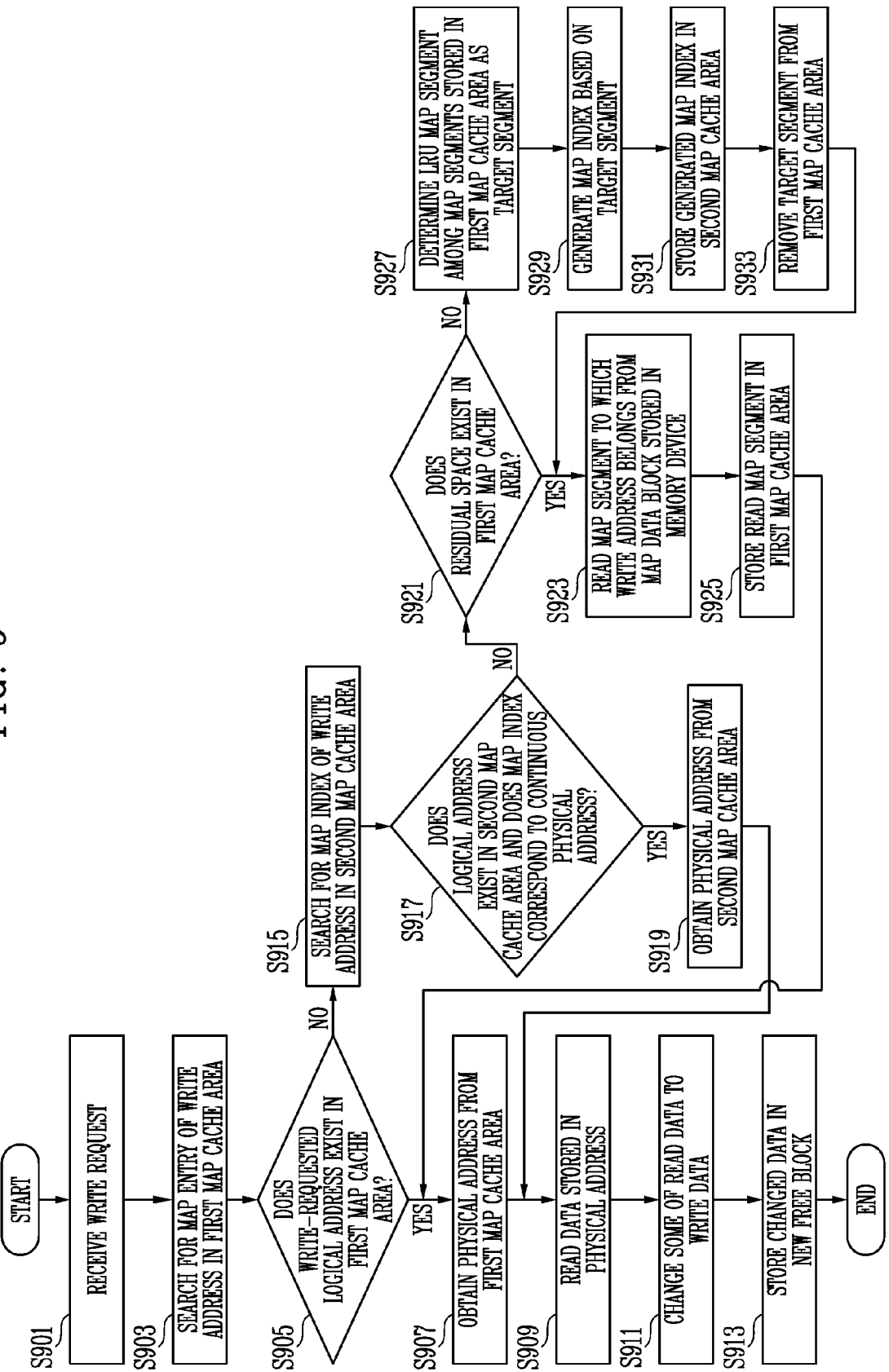
FIG. 9 is a flowchart illustrating a write operation method of a storage device according to an embodiment of the present disclosure.

FIG. 9 is a flowchart illustrating a write operation method of a storage device according to an embodiment of the present disclosure.

Referring to FIG. 9, in operation S901, the storage device may receive a write request from the host.

In operation S903, the storage device may search for a map entry corresponding to a write-requested logical address included in the write request in the first map cache area.

In operation S905, the storage device may determine whether the map entry corresponding to the write-requested logical address is included in the first map cache area. As a result of the determination, when the map entry corresponding to the write-requested logical address is included in the first map cache area, the method proceeds to operation S907, otherwise, the method proceeds to operation S915.

In operation S907, the storage device may obtain a physical address corresponding to the write-requested logical address from the map entry included in the first map cache area.

In operation S909, the storage device may read data stored in the obtained physical address.

In operation S911, the storage device may change a portion of the read data corresponding to write data to write data.

In operation S913, the storage device may store the changed data in a new free block.

In operation S915, the storage device may search for the map index corresponding to the write-requested logical address included in the write request in the second map cache area.

In operation S917, the storage device may determine whether a map index corresponding to the write-requested logical address is included in the second map cache area and corresponds to continuous physical addresses. As a result of the determination, when the map index corresponding to the write-requested logical address is found in the second map cache area, and the found map index corresponds to the continuous physical addresses, the method proceeds to operation S919, otherwise, the method proceeds to operation S921.

In operation S919, the storage device may obtain the physical address corresponding to the write-requested logical address from the second map cache area.

In operation S921, the storage device may determine whether a residual space exists in the first map cache area. As a result of the determination, when the residual space exists in the first map cache area, the method proceeds to operation S923, otherwise, the method proceeds to operation S927.

In operation S923, the storage device may read a map segment to which the write-requested logical address belongs from the map data block stored in the memory device.

In operation S925, the storage device may store the read map segment in the first map cache area.

In operation S927, the storage device may determine the LRU map segment among the map segments stored in the first map cache area as the target segment.

In operation S929, the storage device may generate the map index based on the target segment. In operation S931, the storage device may store the target segment configured by the generated map index in the second map cache area.

In operation S933, the storage device may remove the target segment from the first map cache area.

Figure 10:
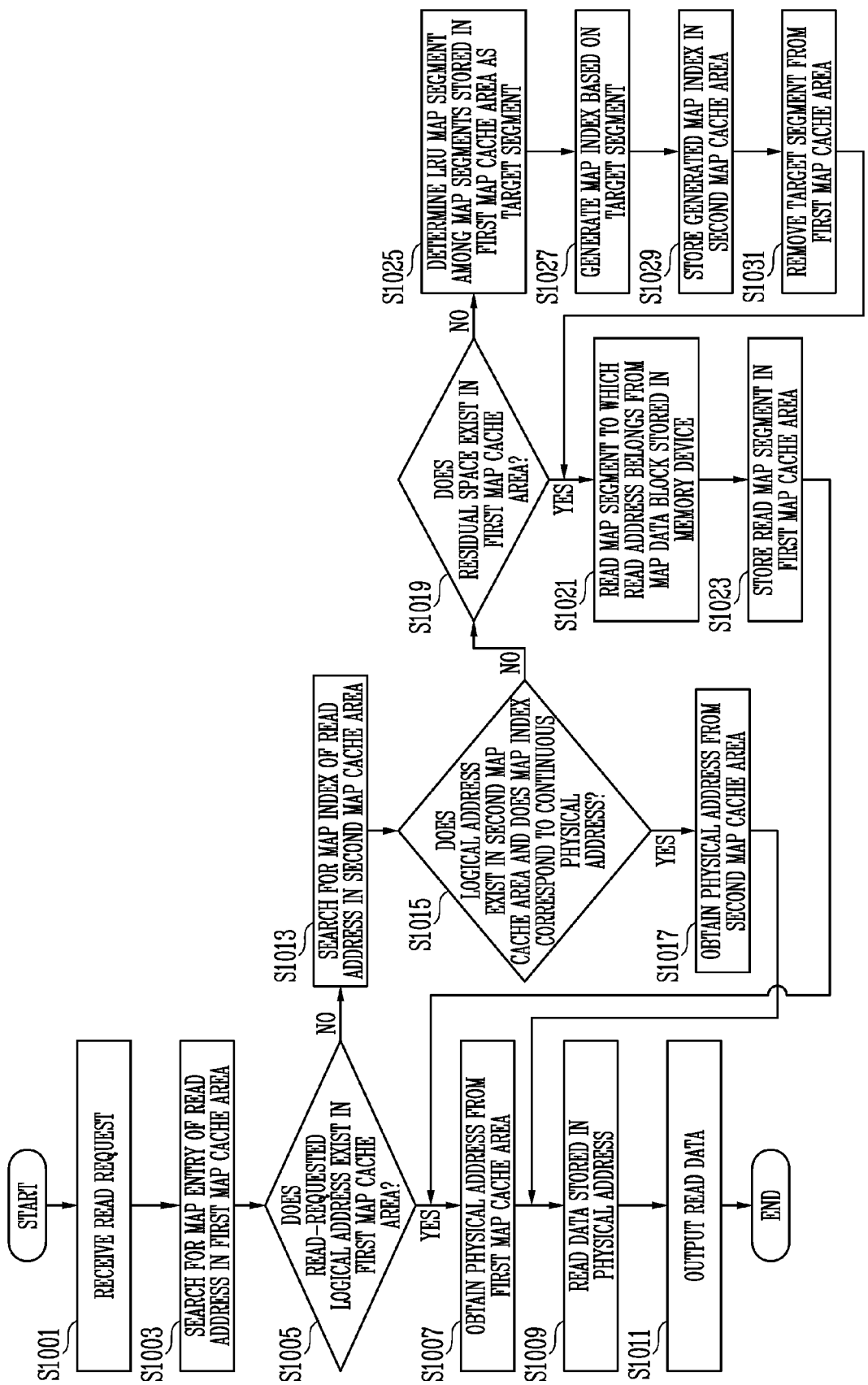
FIG. 10 is a flowchart illustrating a read operation method of a storage device according to another embodiment of the present disclosure.

FIG. 10 is a flowchart illustrating a read operation method of a storage device according to another embodiment of the present disclosure.

Referring to FIG. 10, in operation S1001, the storage device may receive a read request from the host.

In operation S1003, the storage device may search for a map entry corresponding to a read-requested logical address included in the read request in the first map cache area.

In operation S1005, the storage device may determine whether a map entry corresponding to the read-requested logical address is included in the first map cache area. As a result of the determination, when the map entry corresponding to the read-requested logical address is included in the first map cache area, the method proceeds to operation S1007.

In operation S1007, the storage device may obtain a physical address corresponding to the read-requested logical address from the map entry included in the first map cache area.

In operation S1009, the storage device may read data stored in the obtained physical address.

In operation S1011, the storage device may output the read data to the host.

In operation S1013, the storage device may search for the map index corresponding to the read-requested logical address included in the read request in the second map cache area.

In operation S1015, the storage device may determine whether the map index corresponding to the read-requested logical address is included in the second map cache area and corresponds to continuous physical addresses. As a result of the determination, when the map index corresponding to the read-requested logical address is found in the second map cache area, and the found map index corresponds to the continuous physical address, the method proceeds to operation S1017, otherwise, the method proceeds to operation S1019.

In operation S1017, the storage device may obtain the physical address corresponding to the read-requested logical address from the second map cache area.

In operation S1019, the storage device may determine whether a residual space exists in the first map cache area. As a result of the determination, when the residual space exists in the first map cache area, the method proceeds to operation S1021.

In operation S1021, the storage device may read a map segment to which the read-requested logical address belongs from the map data block stored in the memory device.

In operation S1023, the storage device may store the read map segment in the first map cache area.

In operation S1025, the storage device may determine the LRU map segment among the map segments stored in the first map cache area as the target segment.

In operation S1027, the storage device may generate the map index based on the target segment. In operation S1029, the storage device may store the target segment configured by the generated map index in the second map cache area.

In operation S1031, the storage device may remove the target segment from the first map cache area.

Figure 11:
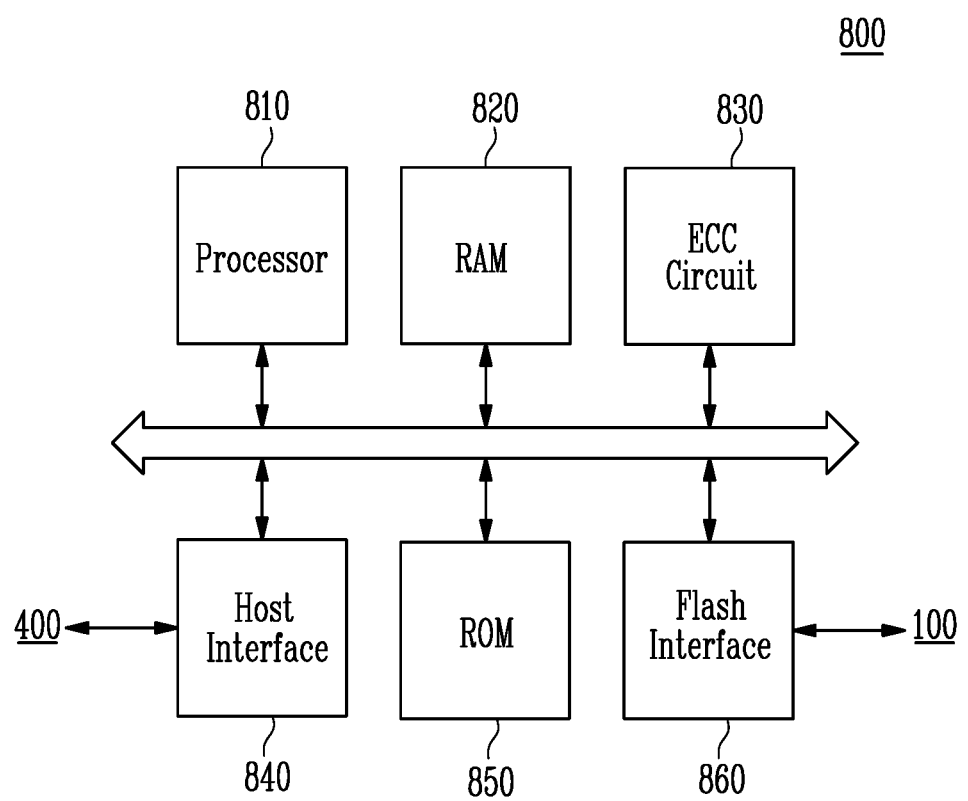
FIG. 11 is a diagram illustrating another embodiment of a memory controller of FIG. 1.

FIG. 11 is a diagram illustrating another embodiment of the memory controller of FIG. 1.

Referring to FIG. 11, the memory controller 800 may include a processor 810, a RAM 820, an error correction circuit 830, a host interface 840, a ROM 850, and a flash interface 860.

The processor 810 may control an overall operation of the memory controller 800. The RAM 820 may be used as a buffer memory, a cache memory, an operation memory, and the like of the memory controller 800. For example, the memory controller 200 described with reference to FIG. 1 may be stored in the RAM 820 or the ROM 850 in a form of software included in firmware executed by the processor 810.

The ROM 850 may store various pieces of information required for the memory controller 800 to operate in a firmware form.

The memory controller 800 may communicate with an external device (for example, the host 400, an application processor, and the like) through the host interface 840.

The memory controller 800 may communicate with the nonvolatile memory device 100 through the flash interface 860. The memory controller 800 may transmit a command CMD, an address ADDR, a control signal CTRL, and the like to the nonvolatile memory device 100 and receive data DATA through the flash interface 860. For example, the flash interface 860 may include a NAND interface.

Figure 12:
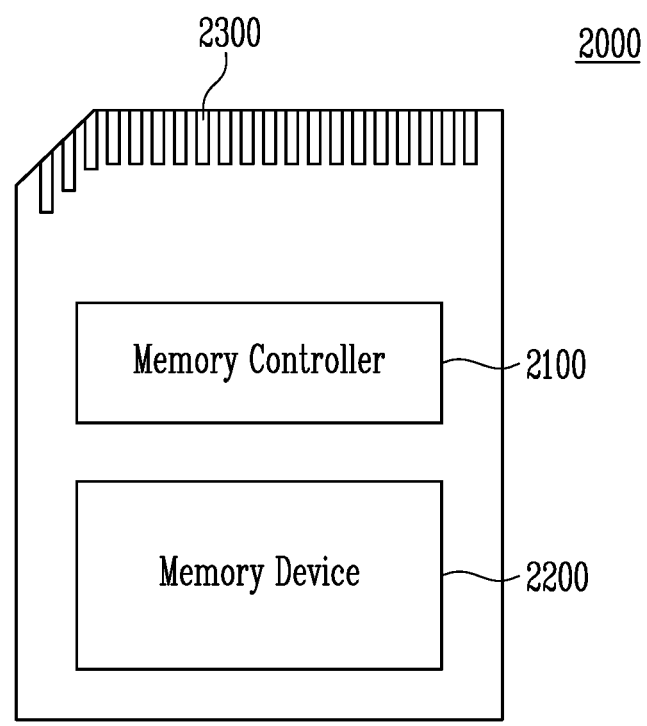
FIG. 12 is a block diagram illustrating a memory card system to which a storage device according to an embodiment of the present disclosure, is applied.

FIG. 12 is a block diagram illustrating a memory card system to which a storage device according to an embodiment of the present disclosure, is applied.

Referring to FIG. 12, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, program, erase, and background operations of the memory device 2200. The memory controller 2100 is configured to provide an interface between the memory device 2200 and a host. The memory controller 2100 is configured to drive firmware for controlling the memory device 2200. The memory controller 2100 may be implemented identically to the memory controller 200 described with reference to FIG. 1.

For example, the memory controller 2100 may include components such as a random access memory (RAM), a processor, a host interface, a memory interface, and an error corrector.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards described above.

For example, the memory device 2200 may be configured of various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque magnetic RAM (STT-MRAM).

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash (CF) card, a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 13:
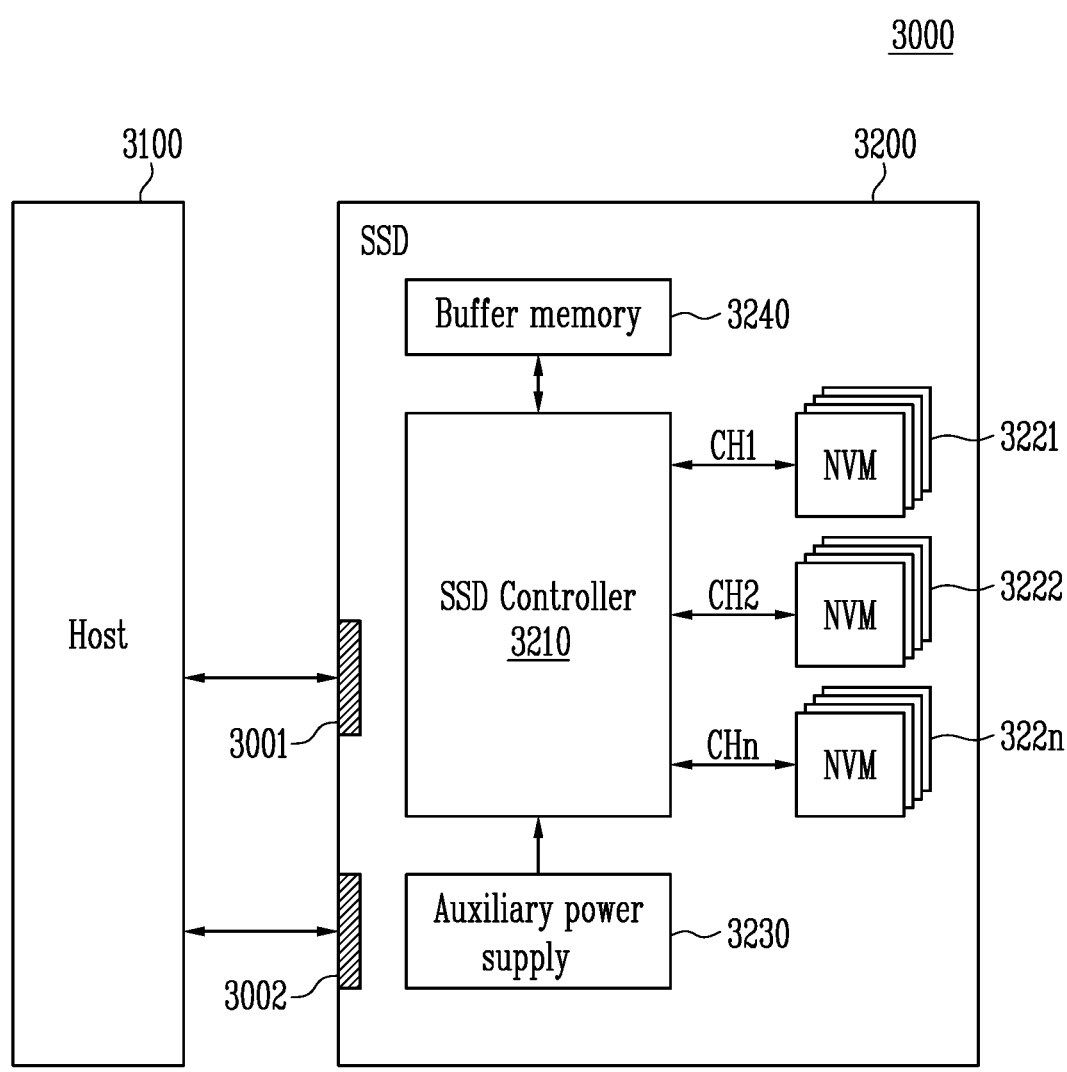
FIG. 13 is a block diagram illustrating a solid state drive (SSD) system to which a storage device according to an embodiment of the present disclosure, is applied.

FIG. 13 is a block diagram illustrating a solid state drive (SSD) system to which a storage device according to an embodiment of the present disclosure is applied.

Referring to FIG. 13, the SSD system 3000 includes a host 3100 and an SSD 3200. The SSD 3200 exchanges a signal with the host 3100 through a signal connector 3001 and receives power through a power connector 3002. The SSD 3200 includes an SSD controller 3210, a plurality of flash memories 3221 to 322n, an auxiliary power supply 3230, and a buffer memory 3240.

According to an embodiment of the present disclosure, the SSD controller 3210 may perform the function of the memory controller 200 described with reference to FIG. 1.

The SSD controller 3210 may control the plurality of flash memories 3221 to 322n in response to the signal received from the host 3100. For example, the signal may be signals based on an interface between the host 3100 and the SSD 3200. For example, the signal may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power supply 3230 is connected to the host 3100 through the power connector 3002. The auxiliary power supply 3230 may receive the power from the host 3100 and may charge the power. The auxiliary power supply 3230 may provide power to the SSD 3200 when power supply from the host 3100 is not smooth. For example, the auxiliary power supply 3230 may be positioned in the SSD 3200 or may be positioned outside the SSD 3200. For example, the auxiliary power supply 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store metadata (for example, a mapping table) of the flash memories 3221 to 322n. The buffer memory 3240 may include a volatile memory such as a DRAM, an SDRAM, a DDR SDRAM, an LPDDR SDRAM, and a GRAM, or a nonvolatile memory such as an FRAM, a ReRAM, an STT-MRAM, and a PRAM.

Figure 14:
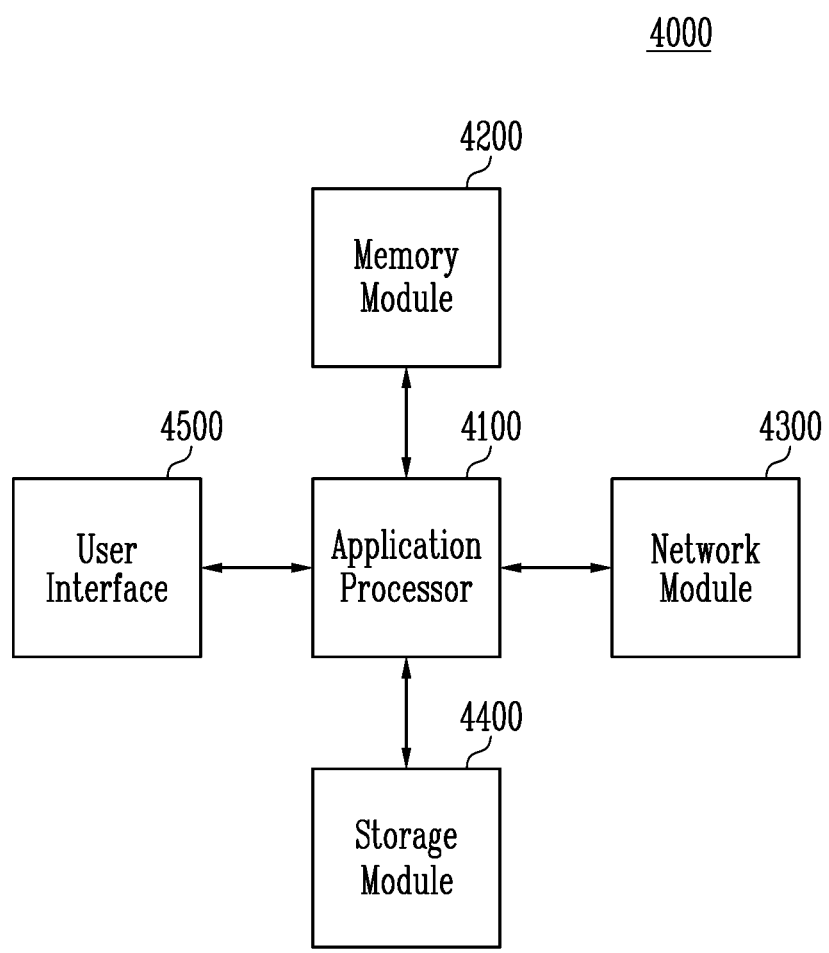
FIG. 14 is a block diagram illustrating a user system to which a storage device according to an embodiment of the present disclosure, is applied.

FIG. 14 is a block diagram illustrating a user system to which a storage device according to an embodiment of the present disclosure, is applied.

Referring to FIG. 14, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a nonvolatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented with a nonvolatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of nonvolatile memory devices, and the plurality of nonvolatile memory devices may operate identically to the nonvolatile memory device 100 described with reference to FIG. 1. The storage module 4400 may operate identically to the storage device 50 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

The above-described embodiments of the present invention are intended to illustrate and not to limit the present invention. Various alternatives and equivalents are possible. The invention is not limited by the embodiments described herein. Nor is the invention limited to any specific type of storage device. Additions, subtractions, or modifications which are apparent in view of the present disclosure are intended to fall within the scope of the appended claims.

What is claimed is:

1. A storage device comprising:
a nonvolatile memory device configured to store map data including a plurality of map segments including mapping information between a logical address provided by a host and a physical address;
a volatile memory device including a first map cache area temporarily storing the map data configured by map entries each corresponding to one logical address, and a second map cache area temporarily storing the map data configured by map indexes each corresponding to a plurality of map entries; and
a memory controller configured to:
obtain a physical address corresponding to a logical address of an operation request from the first map cache area in response to the operation request input from the host,
obtain the physical address corresponding to the logical address of the operation request from the second map cache area when the physical address corresponding to the logical address of the operation request does not exist in the first map cache area, and
control the nonvolatile memory device to perform an operation on the obtained physical address in response to the operation request,
wherein the map indexes include mapping information on a logical address group including a plurality of logical addresses corresponding to the plurality of map entries and one physical address corresponding to the plurality of logical addresses of the logical address group, and
wherein the one physical address is a physical address corresponding to a smallest one among the plurality of logical addresses of the logical address group.

2. The storage device of claim 1,
wherein the first map cache area includes first map segments among the plurality of map segments stored in the nonvolatile memory device, and
wherein each of the first map segments includes a plurality of map entries.

3. The storage device of claim 2,
wherein the second map cache area includes second map segments among the plurality of map segments stored in the nonvolatile memory device, and
wherein each of the second map segments includes a plurality of map indexes.

4. The storage device of claim 3, wherein the plurality of map indexes within one of the second map segments includes physical addresses respectively corresponding to the plurality of map entries within one of the first map segments.

5. The storage device of claim 1, wherein the memory controller includes an operation controller configured to:
search the map entries stored in the first map cache area for the logical address of the operation request,
obtain, when a map entry corresponding to the logical address of the operation request is found in the first map cache area, the physical address corresponding to the logical address of the operation request from the found map entry, and
control the nonvolatile memory device to perform the operation on the obtained physical address in response to the operation request.

6. The storage device of claim 5, wherein the operation controller is further configured to:
search the map indexes stored in the second map cache area for the logical address of the operation request when any map entry corresponding to the logical address of the operation request is not found in the first map cache area,
obtain, when a map index corresponding to the logical address of the operation request is found in the second map cache area, the physical address corresponding to the logical address of the operation request from the found map index, and
control the nonvolatile memory device to perform the operation on the obtained physical address in response to the operation request.

7. The storage device of claim 6, wherein the memory controller further includes a map cache controller configured to:
determine whether a residual space remains in the first map cache area,
remove at least one target segment among first map segments included in the first map cache area according to a determination result, and
store the at least one target segment in the second map cache area.

8. The storage device of claim 7, wherein the memory controller further includes:
a target segment determiner configured to determine a least recently used map segment among the first map segments as the at least one target segment; and
a map index generator configured to generate map indexes using map entries included in the at least one target segment.

9. The storage device of claim 6, wherein the second map cache area further temporarily stores continuity information indicating whether data corresponding to each of the map indexes is stored in continuous physical addresses within the nonvolatile memory device.

10. The storage device of claim 9, wherein when the continuity information indicates that the data corresponding to the map index is stored in the continuous physical addresses, the memory controller controls the nonvolatile memory device to obtain the data corresponding to the map index through a single read operation.

11. The storage device of claim 9, wherein when the continuity information indicates that the data corresponding to the map index is stored in discontinuous physical addresses, the memory controller controls the nonvolatile memory device to obtain the data corresponding to the map index through a plurality of read operations.

12. The storage device of claim 9,
wherein the nonvolatile memory device includes a plurality of memory blocks, and
wherein the memory controller is further configured to perform a migration operation of moving, from a source block to a target block among the memory blocks, data corresponding to a plurality of map entries included in a particular map index having the continuity information indicating that data corresponding to the particular map index is stored in the source block indicated by discontinuous physical addresses among the map indexes stored in the second map cache area.

13. A storage device comprising:

a nonvolatile memory device including a map data block and normal blocks;

a volatile memory device including a first map cache area temporarily storing, in a first mapping unit, map data included in a first map segment stored in the map data block, and a second map cache area temporarily storing, in a second mapping unit, map data included in a second map segment, which is physically separate from the first map cache area; and a memory controller configured to:

obtain a physical address related to a logical address included in an operation request from one of the first map cache area and the second map cache area, and control the nonvolatile memory device to perform an operation corresponding to the operation request based on the obtained physical address related to the logical address included in the operation request, wherein a size of data corresponding to the first mapping unit is less than a size of data corresponding to the second mapping unit, wherein the first mapping unit includes one logical address and one physical address corresponding to the one logical address, wherein the second mapping unit includes a plurality of logical addresses and one physical address corresponding to the plurality of logical addresses, and wherein the one physical address is a physical address corresponding to a smallest one among the plurality of local addresses.

14. The storage device of claim 13, wherein a number of logical addresses included in the first mapping unit is less than a number of logical addresses included in the second mapping unit.

15. The storage device of claim 13, wherein a number of logical addresses included in the second mapping unit is an integer multiple of a number of logical addresses included in the first mapping unit.

16. The storage device of claim 13, wherein each of the normal blocks includes a plurality of pages, and wherein a number of logical addresses included in the second mapping unit is a number of physical addresses corresponding to one of the plurality of pages.

17. The storage device of claim 13, wherein the memory controller controls the nonvolatile memory device to obtain data stored in physical addresses corresponding to logical addresses included in the second mapping unit through one read operation.

18. The storage device of claim 13, wherein the one physical address corresponds to one of the plurality of logical addresses.

19. The storage device of claim 13, wherein the second map cache area further temporarily stores continuity information indicating whether the data corresponding to the second mapping unit is stored in continuous physical addresses within the nonvolatile memory device, and wherein the memory controller is further configured to move, from a source block to a target block among the normal blocks, data corresponding to the second mapping unit having the continuity information indicating that the data corresponding to the second mapping unit is stored in the source block indicated by discontinuous physical addresses among the second mapping unit stored in the second map cache area.

* * * * *